(12) United States Patent
Bissonnette et al.

(10) Patent No.: US 6,789,744 B2
(45) Date of Patent: Sep. 14, 2004

(54) FLUID HEATER WITH A VARIABLE MASS FLOW PATH

(75) Inventors: Lee A. Bissonnette, Clarkston, MI (US); Mark M. Benner, Lake Orion, MI (US); Mark A. Pattison, Windsor (CA)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 217 days.

(21) Appl. No.: 10/059,950

(22) Filed: Jan. 29, 2002

(65) Prior Publication Data

US 2003/0141382 A1 Jul. 31, 2003

(51) Int. Cl.[7] .............................................. B05B 1/24
(52) U.S. Cl. ..................... 239/135; 239/128; 239/130; 239/133; 239/284.1
(58) Field of Search ........................ 239/284.1, 284.2, 239/128, 130, 133, 135

(56) References Cited

U.S. PATENT DOCUMENTS

| | | |
|---|---|---|
| 653,629 A | 7/1900 | Schneider |
| 941,215 A | 11/1909 | Wade |
| 1,523,156 A | 7/1923 | Adams |
| 1,636,190 A | 7/1927 | Mattoney |
| 3,833,909 A | 5/1958 | Levey .......................... 219/39 |
| 3,014,251 A | 12/1961 | Sstern .......................... 20/40.5 |
| 3,202,447 A | 8/1965 | Whaley ..................... 294/87.2 |
| 3,292,866 A | 12/1966 | Benner ...................... 239/284 |
| 3,332,045 A | 7/1967 | Rodaway ..................... 335/81 |
| 3,338,476 A | 8/1967 | Marcoux ..................... 222/146 |
| 3,427,675 A | 2/1969 | Tibbet |
| 3,489,884 A | 1/1970 | Wasekeski .................. 219/522 |
| 3,553,428 A | 1/1971 | McGhee ..................... 219/494 |
| 3,632,042 A | 1/1972 | Goulish ...................... 239/130 |
| 3,668,757 A | 6/1972 | Rieden ...................... 29/157.3 |
| 3,716,886 A | 2/1973 | Klomp |
| 3,756,510 A | 9/1973 | Nitterl ........................ 239/129 |
| 3,785,359 A | 1/1974 | Whittaker .................. 126/19.5 |
| 3,888,412 A | 6/1975 | Lundo ................... 237/12.3 B |
| 3,891,827 A | 6/1975 | Wyse ......................... 219/302 |
| 3,977,436 A | 8/1976 | Larner .................... 137/625.65 |
| 3,979,068 A | 9/1976 | Applebaum ............ 239/284 R |
| 4,090,668 A | 5/1978 | Kochenour ................. 239/130 |
| 4,106,508 A | 8/1978 | Berlin ........................ 128/346 |
| 4,159,026 A | 6/1979 | Williamson .............. 137/625.5 |
| 4,177,375 A | 12/1979 | Meixner ..................... 219/441 |
| 4,212,425 A | 7/1980 | Schlick ....................... 239/133 |
| 4,248,383 A | 2/1981 | Savage ....................... 239/284 |
| 4,253,493 A | 3/1981 | English ................. 137/625.18 |
| 4,295,111 A | 10/1981 | Frosch ....................... 335/256 |
| 4,295,769 A | 10/1981 | Douthett .................... 411/411 |
| 4,306,589 A | 12/1981 | Harned .................. 137/625.65 |
| 4,358,652 A | 11/1982 | Kaarup ..................... 219/10.55 |
| 4,403,756 A | 9/1983 | Berlin ........................ 244/223 |
| 4,417,116 A | 11/1983 | Black |
| 4,430,994 A | 2/1984 | Clawson ................. 128/203.27 |
| 4,489,863 A | 12/1984 | Horehos ..................... 222/504 |
| 4,508,957 A | 4/1985 | Rocchitelli |
| 4,524,797 A | 6/1985 | Lungu ........................ 137/343 |

(List continued on next page.)

FOREIGN PATENT DOCUMENTS

| | | |
|---|---|---|
| CA | 1216713 | 1/1987 |
| CA | 2133592 | 4/1995 |
| CA | 2176539 | 11/1997 |

(List continued on next page.)

*Primary Examiner*—Robin O. Evans
(74) *Attorney, Agent, or Firm*—J. Gordon Lewis (57) ABSTRACT

A fluid heater apparatus includes a thermally conductive mass formed of a stack of lamina, each having apertures for receiving heater element(s) therethrough and apertures which are alignable between opposed ends of the stack to form fluid flow paths. The lamina are rotatably offset from adjacent lamina in one step or groups of two or more steps to create helical flow paths in the throughbores.

45 Claims, 9 Drawing Sheets

U.S. PATENT DOCUMENTS

| | | | | |
|---|---|---|---|---|
| 4,534,539 | A | 8/1985 | Dettmann | 251/65 |
| 4,561,632 | A | 12/1985 | Hugler | 251/129.15 |
| 4,574,841 | A | 3/1986 | Hugler | 137/625.44 |
| 4,589,374 | A | 5/1986 | Farina | 122/14 |
| 4,669,430 | A | 6/1987 | Reinold | 123/179 |
| 4,689,548 | A | 8/1987 | Mechlenburg | 323/243 |
| 4,690,371 | A | 9/1987 | Bosley | 251/65 |
| 4,832,262 | A | 5/1989 | Robertson | 239/129 |
| 4,858,576 | A | 8/1989 | Jeffries | 123/145 |
| 4,877,186 | A | 10/1989 | Scholl | 239/75 |
| 4,894,520 | A | 1/1990 | Moran | 219/497 |
| 4,905,904 | A | 3/1990 | Ohara | 239/284.1 |
| 4,927,060 | A | 5/1990 | Snowball | 222/146.5 |
| 4,975,630 | A | 12/1990 | Ma | 323/300 |
| 5,012,977 | A | 5/1991 | Karklins | 239/284.1 |
| 5,074,471 | A | 12/1991 | Baumgarten | 239/284.1 |
| 5,118,040 | A | 6/1992 | Abe | 239/294.1 |
| 5,168,595 | A | 12/1992 | Naylor, Jr. | 15/250.4 |
| 5,180,896 | A | 1/1993 | Gibby | 219/10.55 |
| 5,183,099 | A | 2/1993 | Bechu | 165/41 |
| 5,203,049 | A | 4/1993 | Nogawa | |
| 5,247,148 | A | 9/1993 | Mencher | 219/10.55 |
| 5,249,623 | A | 10/1993 | Muller | 165/156 |
| 5,254,083 | A | 10/1993 | Gentelia | 604/35 |
| 5,280,806 | A | 1/1994 | Glazebrook | 137/517 |
| 5,289,698 | A | 3/1994 | Garimella | 62/498 |
| 5,318,071 | A | 6/1994 | Gaiardo | 137/625.65 |
| 5,345,968 | A | 9/1994 | Day | 137/625.46 |
| 5,351,934 | A | 10/1994 | Jensen | 251/65 |
| 5,354,965 | A | 10/1994 | Lee | |
| 5,369,247 | A | 11/1994 | Doljack | 219/485 |
| 5,383,247 | A | 1/1995 | Nickel | 15/250.04 |
| 5,421,727 | A | 6/1995 | Stevens | |
| 5,428,206 | A | 6/1995 | Uchida | 219/505 |
| 5,433,382 | A | 7/1995 | Baumgarten | 239/284.1 |
| 5,509,606 | A | 4/1996 | Breithaupt et al. | 239/130 |
| 5,598,502 | A | 1/1997 | Takahashi | 392/502 |
| 5,636,407 | A | 6/1997 | Len | 15/250.19 |
| 5,673,360 | A | 9/1997 | Scripps | 392/405 |
| 5,676,868 | A | 10/1997 | Simmons | 219/202 |
| 5,727,769 | A | 3/1998 | Suzuki | 251/129.15 |
| 5,742,478 | A | 4/1998 | Wu | |
| 5,784,751 | A | 7/1998 | Tippets | 15/250.04 |
| 5,881,428 | A | 3/1999 | Simmons | 15/250.04 |
| 5,927,608 | A | 7/1999 | Scorirobli | 239/284.1 |
| 5,947,348 | A | 9/1999 | Briski | 222/640 |
| 5,957,384 | A | 9/1999 | Lansinger | 239/284.1 |
| 5,979,796 | A | 11/1999 | Ponziani | 239/284.1 |
| 5,988,529 | A | 11/1999 | Suhring | 239/284.1 |
| 6,009,369 | A | 12/1999 | Boisvert | 701/99 |
| 6,029,908 | A | 2/2000 | Petzold | 239/284 |
| 6,032,324 | A | 3/2000 | Lansinger | 15/250.04 |
| 6,119,300 | A | 9/2000 | Schmid | 15/250.04 |
| 6,133,546 | A | 10/2000 | Bains | 219/202 |
| 6,148,258 | A | 11/2000 | Boisvert | 701/99 |
| 6,164,564 | A | 12/2000 | Franco et al. | 239/284.1 |
| 6,199,587 | B1 | 3/2001 | Shlomi | 137/625.5 |
| 6,236,019 | B1 | 5/2001 | Piccione | 219/203 |
| 6,247,653 | B1 | 6/2001 | Seyfarth | 239/284.1 |
| 6,257,500 | B1 | 7/2001 | Petzold | 239/284.1 |
| 6,260,608 | B1 | 7/2001 | Kim | 165/41 |
| 6,271,506 | B1 | 8/2001 | Glaser | 219/505 |
| 6,330,395 | B1 | 12/2001 | Wu | |

FOREIGN PATENT DOCUMENTS

| | | |
|---|---|---|
| CH | 688 432 | 9/1997 |
| DE | 854 403 | 11/1952 |
| DE | 24 54 920 | 5/1976 |
| DE | 28 04 804 | 8/1979 |
| DE | 23 53 738 | 9/1980 |
| DE | 3430 653 | 8/1984 |
| DE | 3 507 900 | 11/1986 |
| DE | 35 26 430 | 5/1987 |
| DE | 39 07 968 | 9/1990 |
| DE | 3507900 | 11/1993 |
| DE | 198 29 681 | 7/1998 |
| DE | 19820220 | 11/1999 |
| DE | 19935134 | 1/2001 |
| EP | 1 959 978 | 5/1962 |
| EP | 0 245 641 | 11/1987 |
| EP | 0 342 516 | 11/1989 |
| EP | 1 006 029 | 11/1999 |
| EP | 1 006 030 | 11/1999 |
| EP | 1 213 197 | 12/2000 |
| EP | 1162118 | 12/2001 |
| EP | 1 006 030 | 11/2002 |
| FR | 2 585 311 | 1/1987 |
| FR | 2 605 273 | 4/1988 |
| FR | 2 609 437 | 7/1988 |
| FR | 2 677 939 | 12/1992 |
| FR | 2707230 | 7/1993 |
| FR | 2 707 230 | 7/1993 |
| GB | 370687 | 5/1931 |
| GB | 1151214 | 5/1969 |
| GB | 1 152 170 | 5/1969 |
| GB | 1 318 498 | 5/1973 |
| GB | 1 451 666 | 10/1974 |
| GB | 2 044 601 | 10/1980 |
| GB | 2 121 681 | 1/1984 |
| GB | 2 225 096 | 5/1990 |
| GB | 2 260 399 | 4/1993 |
| GB | 2 27 1276 | 4/1994 |
| GB | 2 271 276 | 4/1994 |
| GB | 2 271 712 | 4/1994 |
| GB | 2 290 461 | 1/1996 |
| GB | 2 305 233 | 4/1997 |
| GB | 2 308 971 | 7/1997 |
| GB | 2 310 795 | 8/1997 |
| GB | 2 320 086 | 6/1998 |
| GB | 2 331 231 | 5/1999 |
| GB | 2354 688 | 11/2000 |
| GB | 2 350 555 | 12/2000 |
| GB | 2 354 688 | 3/2001 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| US | 2002/0040895 | 4/2002 |
| US | 2002/0137455 | 9/2002 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |
| WO | WO 02/092237 | 11/2002 |

FLUID HEATER WITH A VARIABLE MASS FLOW PATH

BACKGROUND

This invention relates, in general, to fluid heater apparatus and, more particularly, to fluid heater apparatus which provide a heated wash fluid to a cleanable surface, and, still more specifically, to a heated wash fluid for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacent to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is known to provide a heated wash fluid to a vehicle window spray device. Various wash fluid heating devices have been developed, but all typically utilize a heat exchanger design wherein a heat source is disposed in a body through which the wash fluid flows. The wash fluid picks up heat source in the heat exchange body to elevate its temperature prior to dispersion through the spray nozzle onto a vehicle window.

However, such prior wash fluid heating devices are inefficient in terms of heat transfer capability as well as being able to only provide a small quantity or a short duration of heated wash fluid onto a vehicle window. Further, direct contact of the fluid with the heat source causes hot spots in the fluid and lower temperature fluid portions which do not contact the heat source.

Thus, it would be desirable to provide a fluid heater apparatus which provides a heated fluid in an efficient manner, which has a minimal power requirements, and, which is capable of providing near instantaneous heated wash fluid and larger quantities of heated wash fluid for a longer spray application of the heated fluid onto a cleanable surface than previously devised wash fluid heater devices.

SUMMARY

The present invention is a heater apparatus ideally suited for heating fluid.

The heater apparatus includes a thermally conductive mass having a plurality of throughbores extending through first and second ends. Heater means are mounted in the thermally conductive mass concentrically within and surrounded by the plurality of throughbores, the heater means supplying heat, when activated, to the thermally conductive mass. An inlet fluidically coupled to one end of each of the plurality of throughbores and an outlet fluidically coupled to each of the other end of the throughbores define parallel flow paths between the inlets and the outlets through the plurality of throughbores wherein fluid flowing through the throughbores absorbs heat from the thermally conductive mass.

In one aspect, each of the plurality of throughbores has a helical path between opposed ends.

In another aspect, the throughbores have identical flow cross-section areas.

In one aspect, the throughbores are arranged in first and second concentric, circumferentially spaced inner and outer rings about the thermally conductive mass. The maximum cross-sectional dimension of the bores in the inner ring is less than the maximum cross-sectional dimension of the throughbores in the outer ring.

In another aspect, the thermally conductive mass is formed of a plurality of lamina, each lamina carrying the throughbores and apertures for receiving the heater element(s) therethrough.

Certain lamina are rotatably offset from adjacent lamina by an offset distance to create a stepwise helical advance in the throughbore through the stack of lamina between the first and second ends of the stack.

The present heater apparatus is also usable in non-vehicle and non-cleaning fluid applications. For example, the present heater apparatus can be easily adapted for use in providing elevated, high temperature fluids for home, office and camper use as well as for industrial processes.

In one aspect, a plurality of lamina are coaxially aligned and rotatably offset from a like number of lamina which are coaxially aligned with other.

In summary, there has been disclosed a fluid heater apparatus module apparatus which can be variably adjusted to provide different fluid discharge temperatures as needed for different applications. Despite the variable fluid discharge temperatures which may be necessary for each different application, the overall construction of the heater apparatus is substantially identical thereby minimizing manufacturing costs, assembly and part multiplication.

BRIEF DESCRIPTION OF THE DRAWINGS

The various features, advantages and other uses of the present invention will become more apparent by referring to the following detailed description and drawing in which.

DETAILED DESCRIPTION

Figure 1:
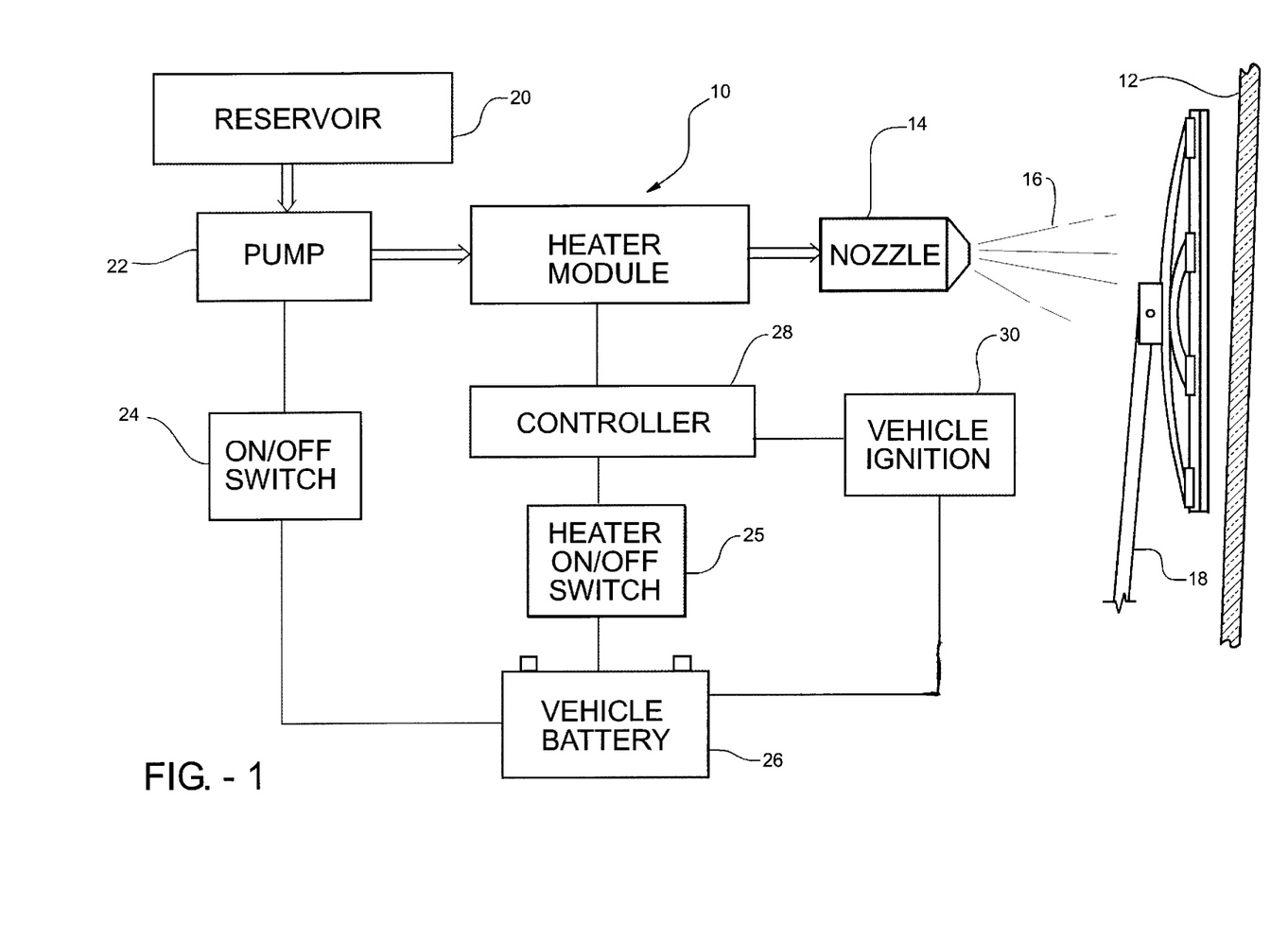
FIG. 1 is a block diagram of a fluid heater apparatus according to the present invention used in an exemplary vehicle window wash fluid delivery system.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for vehicle mirrors, camera, lenses, or sensor covers, etc.

As is conventional, a vehicle window 12, such as a windshield, rear backlight or window, etc., has one or more fluid delivery devices, such as spray nozzles 14, located in a position to dispense or spray a pattern of wash fluid 16 onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is supplied with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as 160° F.–170° F., by example only, by the heater module 10. A suitable control circuit or controller 28 is provided for controlling the operation of the heater elements in the heater module 10. The controller 28 is also supplied with electric power from the vehicle battery 26. The controller 28 is activated by an "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

The heater module 20 is shown in greater detail in FIGS. 2-14. The heater module 20 includes a housing 40 formed of a generally cylindrical, tubular sleeve 42 having a hollow throughbore extending between opposed ends. The sleeve 42 is formed of a thermal insulating material, such as a foam plastic material, to thermally insulate the high temperature fluids passing through a heat exchange, thermally conductive mass 50 mounted within the housing 40.

Figures 2, 3:
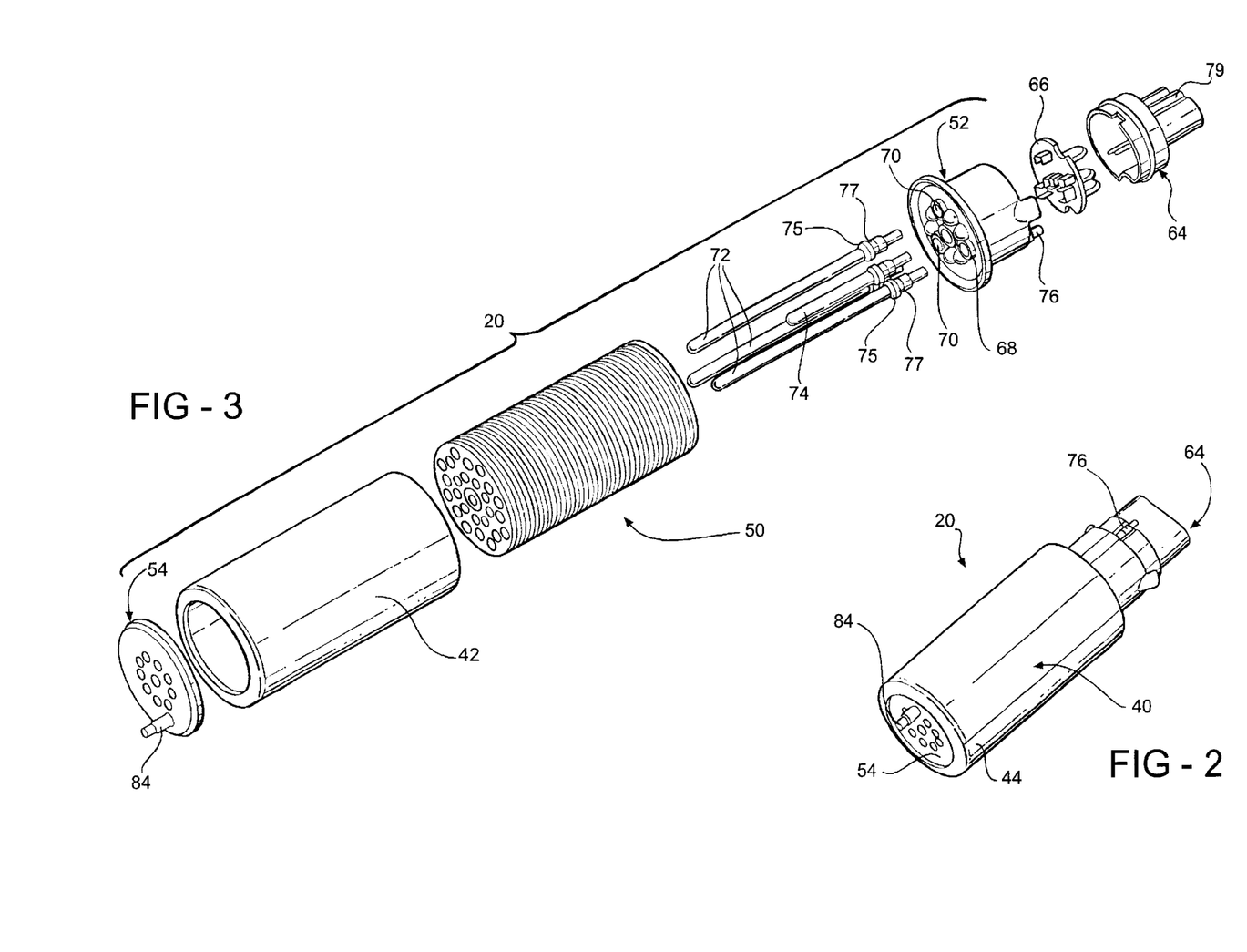
FIG. 2 is a top perspective view of the heater apparatus according to the present invention.
FIG. 3 is an exploded, perspective view of the heater apparatus shown in FIG. 2.

As shown in FIG. 3, the heat exchange mass or body 50 is mounted within the sleeve 42. The heat exchange mass 50 is held in position within the sleeve 42 by a top end cover 52 and a bottom end cover 54 both of which are fixedly mounted to opposite ends of the sleeve 42 by suitable means, such as swagging, welding, threads, etc.

Figure 5:
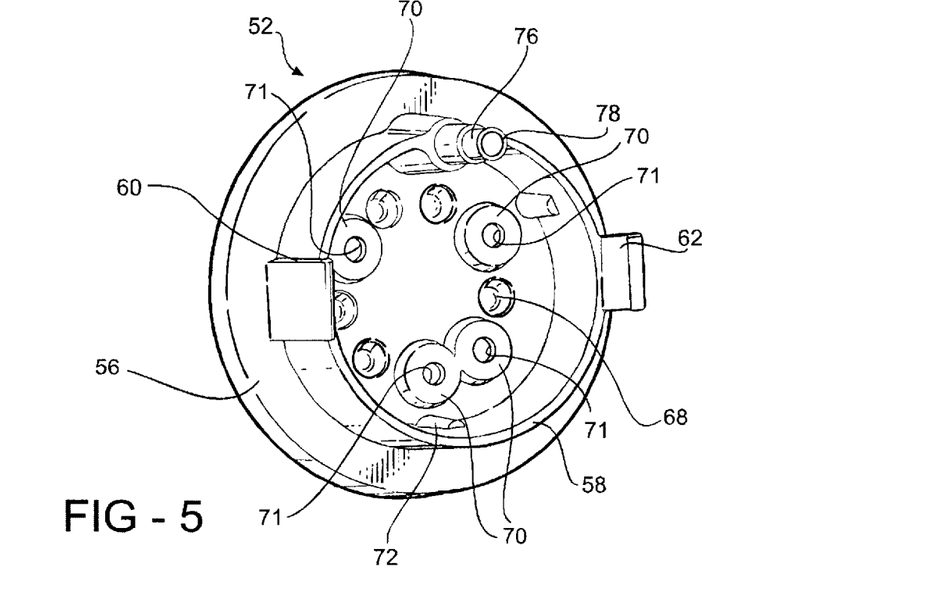
FIG. 5 is an inside perspective view of the top end cover of the heater apparatus shown in FIG. 3.

As shown in FIGS. 3 and 5, the top end cover 52 includes an enlarged diameter end flange 56 at one end and a generally circular sleeve 58 projecting therefrom to an opposite end. Side tabs 60 and 62 project along diametrically opposed portions of the sleeve 58 and outward from the end of the sleeve 58 for connection to ridge 64 on a housing 94. The end flange 56 is adapted to seat against one end of the heat exchange mass 50 within the interior of the sleeve 42. The sleeve 58 projects axially from the flange 56 and is adapted to mate with an electric connector housing 64 and an electric terminal assembly 66, both described in greater detail hereafter.

A plurality of circumferentially arranged dimples 68 are formed in the end flange 56 within the interior of the sleeve 58. Interspersed within the dimples 68 are a plurality of bosses 70, with four being shown by way of example only. Each boss 70 includes a throughbore or aperture 71 which is adapted to receive a cylindrical heating element 72 or a ground rod 74 or a ground lead frame, as described hereafter.

As also shown in FIGS. 3 and 5, an inlet port fitting 76 is also formed in the top end cover 52, integrally with the sleeve 58, by way of example only. A bore 78 extends through the fitting 76 and the end flange 56.

The heater elements 72 or the ground rod 74 may be formed of any suitable heating element. In one aspect, the heater element 72 are formed of "calrod". Although different materials maybe used, one example of a calrod construction is a Nichrome wire inside of a stainless steel sheath.

As shown in FIG. 3, a flange 75 is formed on one end of the sheath of each heater element 72 and ground rod 74. The flange 76 supports a seal element 77, such as an O-ring, for sealing the mounting connection between the heater elements 72 and the ground rod 74 and the top end cover 52.

Figure 4:
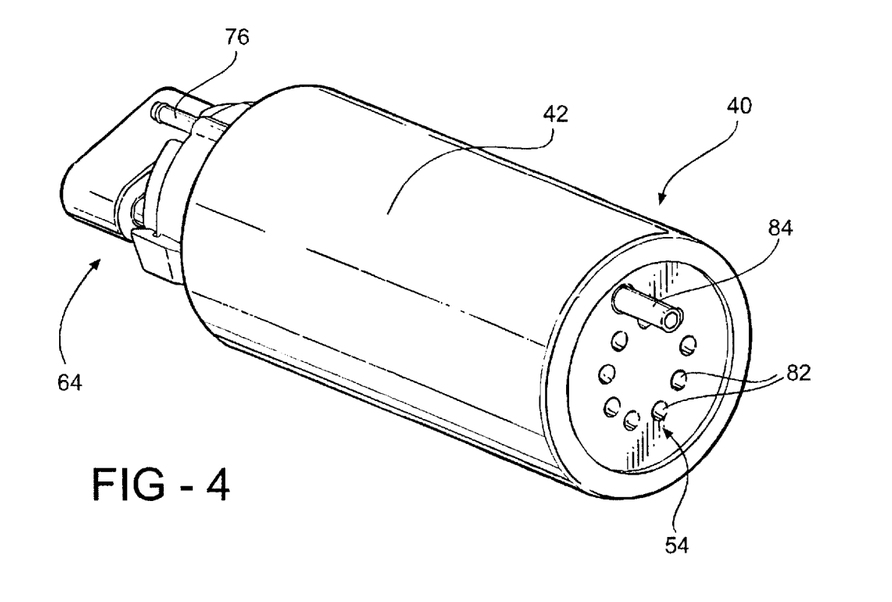
FIG. 4 is a bottom perspective view of the heater apparatus shown in FIGS. 2 and 3.
Figure 6:
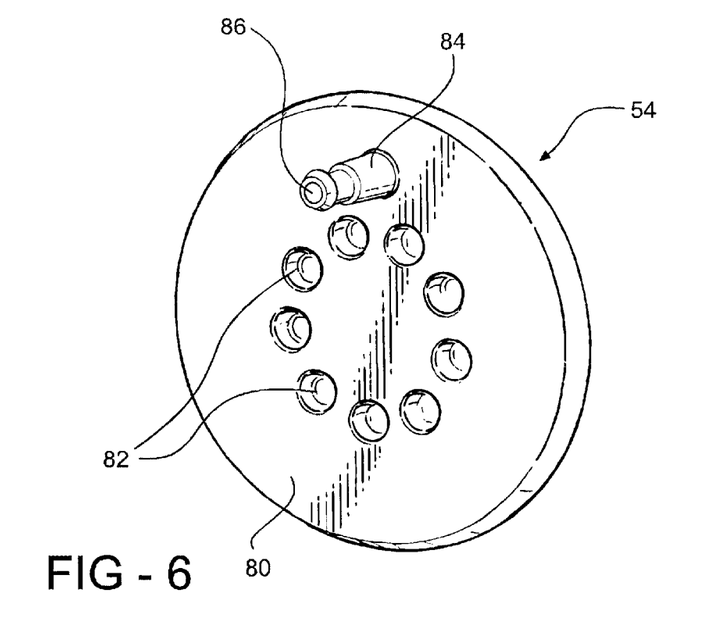
FIG. 6 is a perspective view of the base and cover of the heater apparatus shown in FIG. 3.

The bottom end cover 54 is shown in detail in FIGS. 3 and 6. The bottom end cover 54 has a generally planar wall 80 with a circular cross-section so as to be fixed to an inner end of the sleeve 42 as shown in FIG. 4. A plurality of dimples 82 are formed in a circumferentially spaced, circular arrangement in the wall 80 of the bottom end cover 54 and are arranged to project into certain apertures in the heat exchange mass 50 as will be described in greater detail hereafter. An outlet port or fitting 84 projects from the wall 80. A throughbore 86 extends through the port or fitting 84 and the wall 80 for communication with the interior of the inner sleeve 42.

Figure 7:
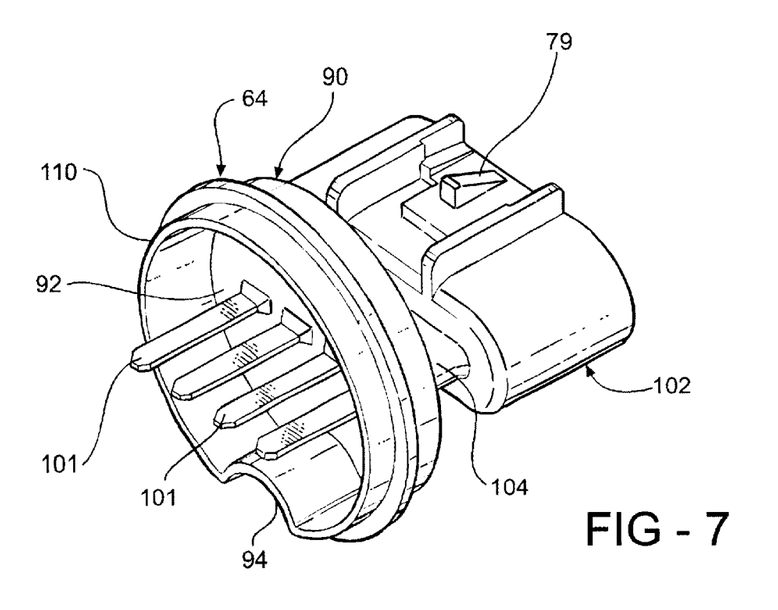
FIG. 7 is a top perspective view of the connector housing of the heater apparatus shown in FIG. 3.

The electrical connector housing 64 is fixed within one end of the inner sleeve 42. The connector housing 64 is formed as an integral, one piece body 90 of a suitable electrically and thermally insulating plastic as shown in FIGS. 3 and 7. The body 90 includes a first generally circular end portion 92 having a key or detent 94 at one circumferential position. The first end portion 92 forms an interior recess which surrounds one end of terminal leads 101. The terminal leads 101 are fixedly mounted in the first end portion 92, such as through slots formed in a central wall of the first end portion 92. One end of the terminal leads 101, not shown, is connected to a circuit board 66, shown in FIG. 3, containing control circuitry mounted in the interior of the first end portion 92.

The terminal leads 101 extend from the second end portion 92 of the connector housing 64 to an electrical contact connection with the exposed end of the inner wire portion of each heating element 72 or ground rod 74.

Figure 8:
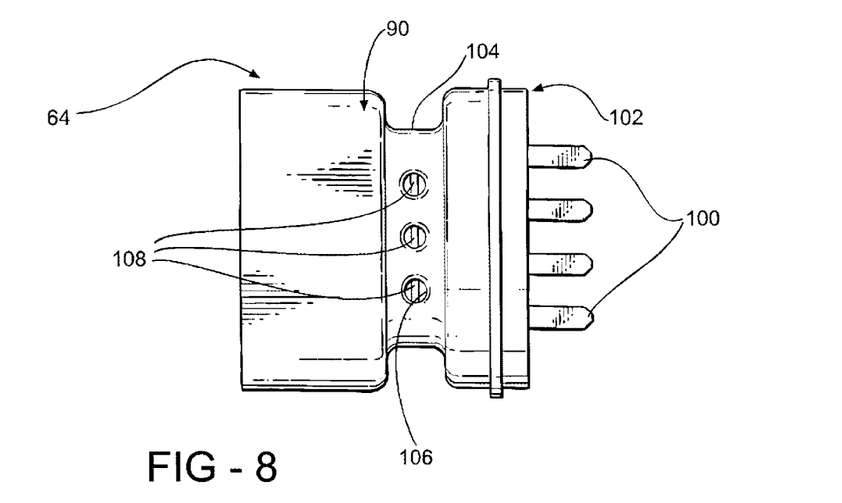
FIG. 8 is a bottom elevational view of the connector housing shown in FIG. 7.

A second portion 102 of the connector housing 64 has a generally rectangular shape with rounded ends and is connected to the first portion 90 by a narrow rib 104 having a plurality of through apertures 106 formed therein as shown in FIG. 8.

Figure 9:
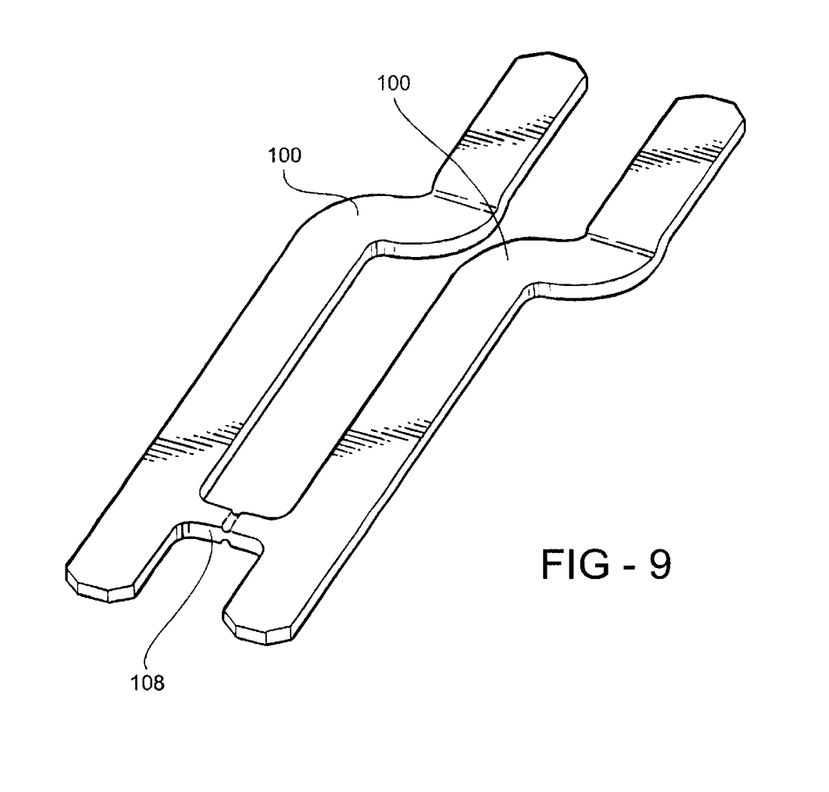
FIG. 9 is a perspective view of a terminal lead assembly shown in FIGS. 3, 7 and 8.

Terminal leads 100, as shown in detail in FIG. 9, are initially joined by frangible webs 108 in pairs or groups of three or four leads 100. The terminal leads 100 are mounted through an interior wall in the first end portion 92 of the connector housing 64 so that the webs 108 connecting the terminal leads 100 together are exposed through the apertures 106 in the web 104 as shown in FIGS. 8 and 9. After the terminal leads 100 are fixedly mounted in the connector housing 64, the webs 108 are separated or broken away from the terminals or leads 100 to separate each terminal 100 from the other terminal leads 100. The terminal leads 100 are exposed in the second portion 102 of the connector housing 64 and mate with a plug containing complementary sockets for connecting electrical power, ground and external signals to the terminal leads 100. The other end of the terminal leads 100 are mounted in sockets or soldered to terminals on the circuit board 66 mounted in the first end portion 92 of the connector housing 64.

As shown in FIG. 3, at least one and preferably a pair of diametrically opposed latch elements 79 are formed on the connector housing 64. The latch elements 79 mate with a latch receiver or recess in the top end cover 52 to latchingly couple the connector housing 64 to the top end cover 52 and sandwich the circuit board 66 between adjacent end flanges of the connector housing 64 and the top end cover 52.

Figure 10:
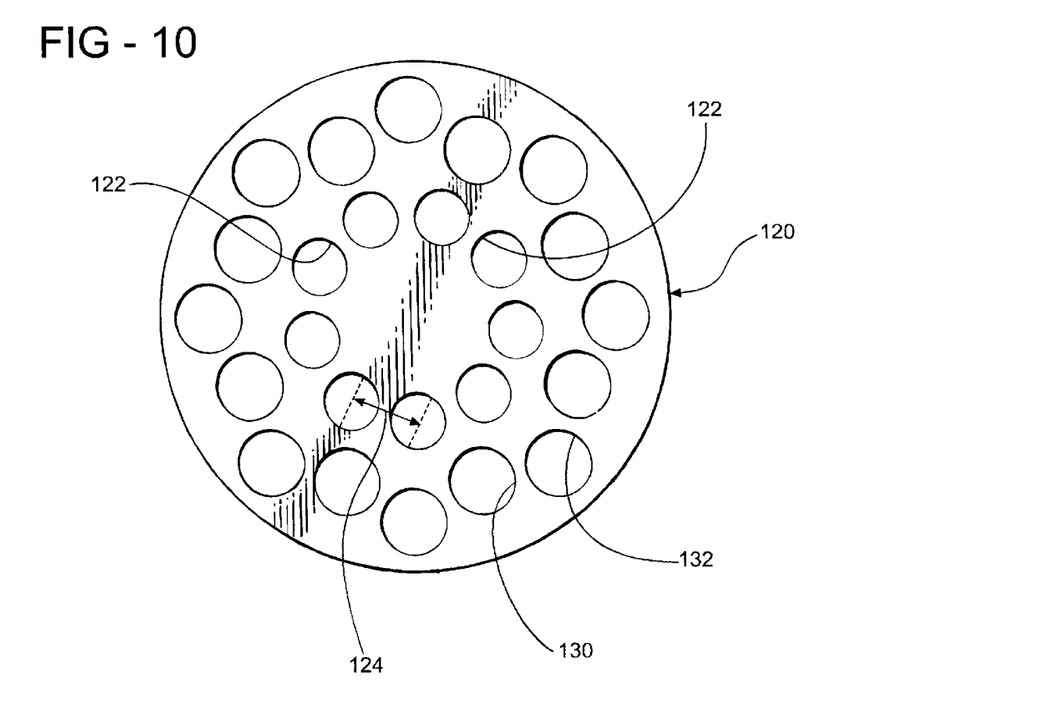
FIG. 10 is a plan elevational view of a heat exchange lamina used in the heater apparatus of the present invention.

As shown in FIG. 3 and in detail in FIGS. 11–17, the heat exchange mass 50, also hereafter referred to as a "stack", is formed of a plurality of individual heat exchange elements or lamina 120 as shown in FIG. 10. Each lamina 120 has the same identical shape and is formed as a thin plate of a suitable highly thermal conductive material, such as aluminum, ceramic, pressed alumina particles, etc. Each lamina 120 has a circular cross-section so as to fit tightly within the inner diameter of the inner sleeve 42.

Figure 11:
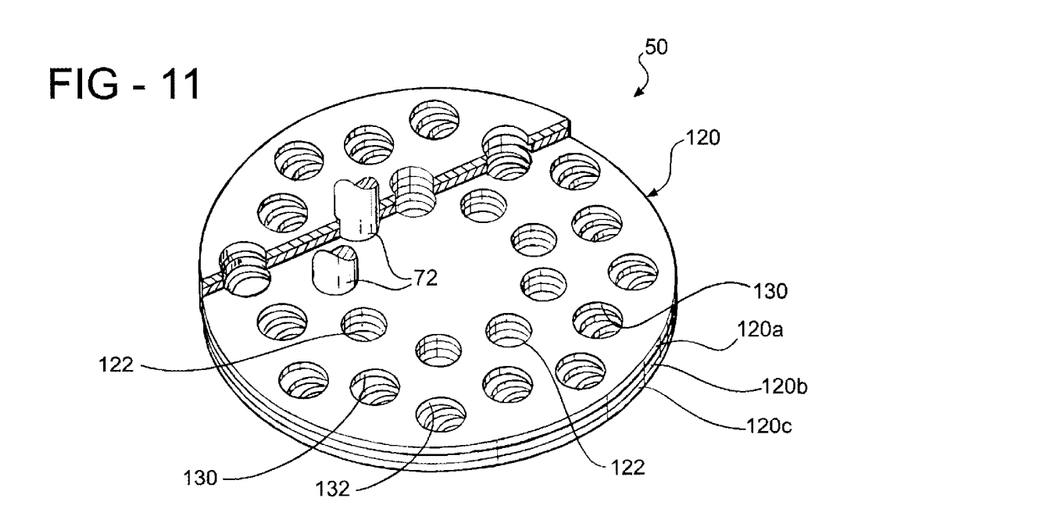
FIG. 11 is a partly broken away, partial perspective view of the assembled heat exchange stack of the heater apparatus according to the present invention.

As shown in FIGS. 10 and 11, each identically constructed lamina 120, including lamina 120a, 120b and 120c are provided with a plurality of inner apertures 122 which are in a generally circular arrangement at a defined circumferential, center to center spacing denoted by reference number 124. This spacing 124 is hereafter used to define a "helical offset".

The inner diameter of the apertures 122 is sized to slidably receive the cylindrical heater elements 72 or the ground rod 74 in any aperture 122. Thus, despite any helical or angular offset between adjacent lamina 120a, 120b and 120c, as described hereafter, either in a single step, a double step, a triple step, a quintuple step helical offset, etc., the apertures 122 in each lamina 120a, 120b, 120c, etc., will remain longitudinally coaxially aligned with the apertures 122 in the adjacent lamina 120a, 120b and 120c. This enables the apertures 122 in the entire heat exchange mass or stack 50 to form elongated, axial throughbores 126 seen in FIG. 12, which slidably receive one of the heater elements 72 or the ground rod 74. The heater elements 72 and the ground rod 74, once inserted into the bores 126 in the heat exchange stack 50, will also retain the lamina 120 in the desired helical offset arrangement as defined hereafter.

Referring back to FIGS. 10 and 11, each lamina 120, 120a, 120b, 120c, etc., also includes a plurality of outer radially disposed apertures arranged in two groups of apertures including an inner group of apertures 130 and an outer group of apertures 132. It will be understood that this arrangement is by example only as the apertures 130 or 132 can be arranged in other configurations. However, the circumferentially spacing between the equal radially spaced inner apertures 130 and the different but still equal radially spaced outer group of apertures 132 disposed at a greater radially spacing then the inner group of apertures 130 provide an optimum number of flow paths through the stack 50 for heat exchange efficiency with fluid flowing through the stack 50 as described hereafter. As shown in FIGS. 10 and 11, the apertures 130 and 132 alternate around the circumference of each lamina 120.

Figure 12:
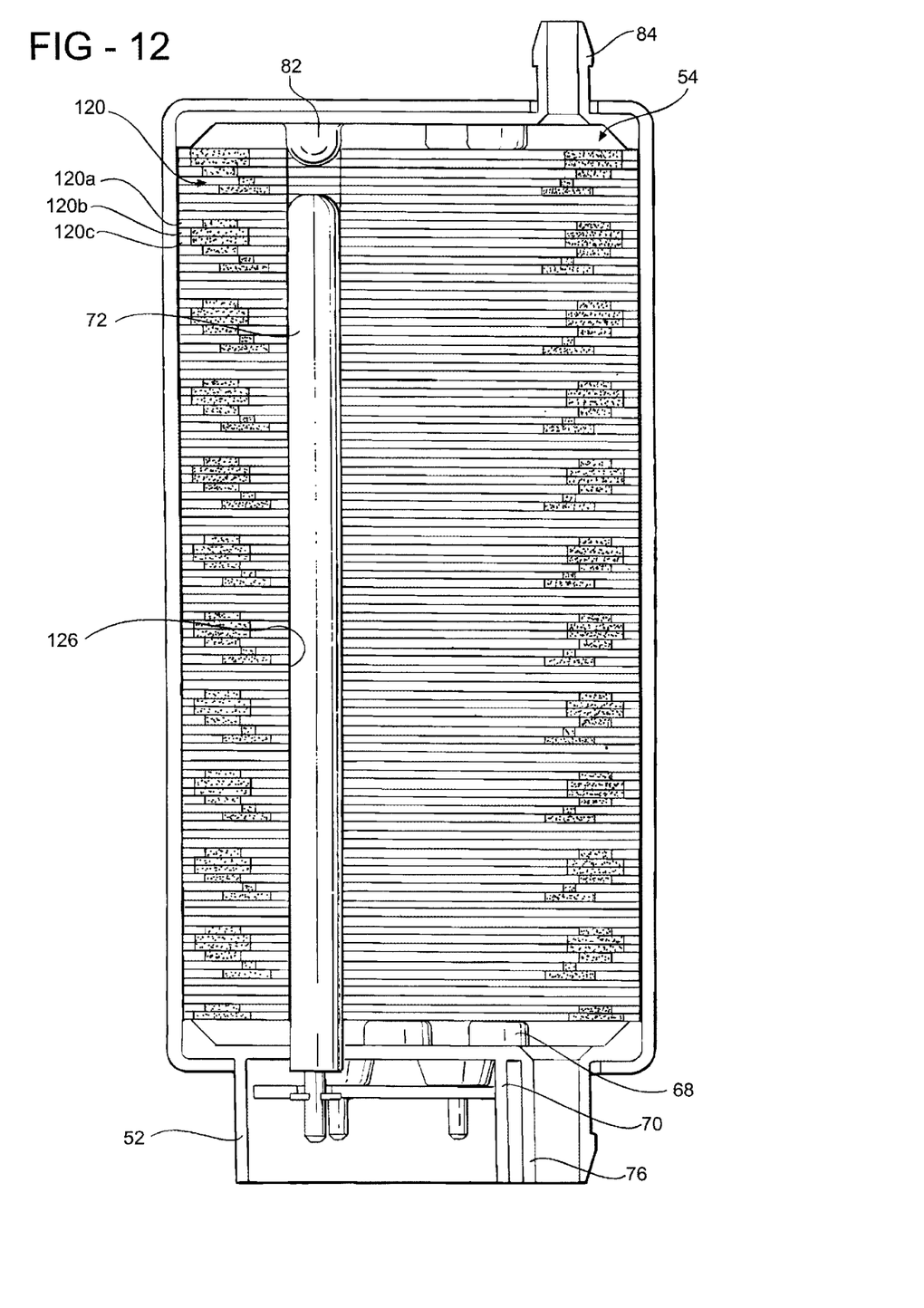
FIG. 12 is a side elevational view of the complete heat exchange stack of the heater apparatus shown in FIG. 3.
Figure 13:
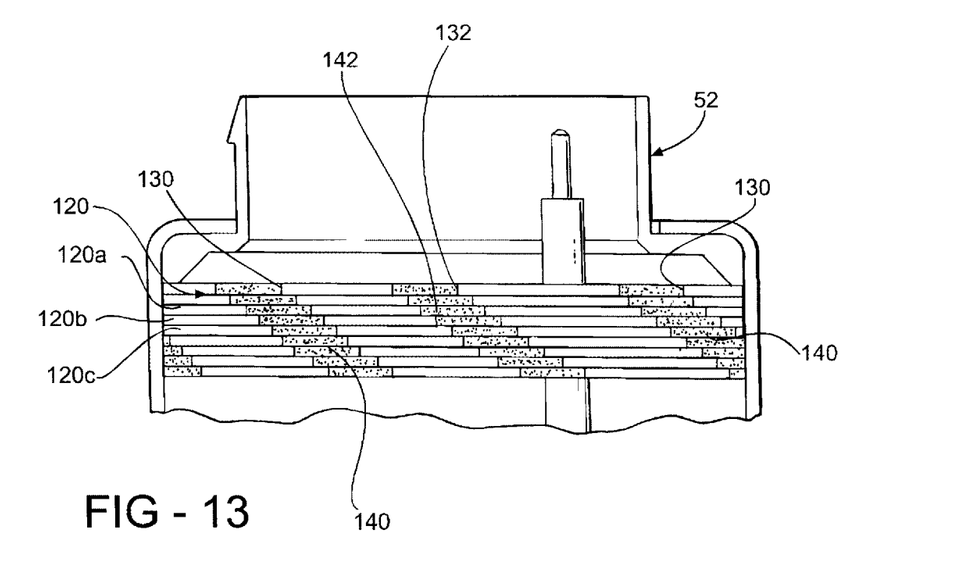
FIG. 13 is a side elevational, pictorial representation of the helical flow paths through the heat exchange stack shown in FIG. 12, with the outer housing broken away and the circularly disposed, helical flow paths shown pictorially in a two dimensional representation.

As shown in FIGS. 12 and 13, for a single step helical offset, the lamina 120 are arranged in stack including lamina 120a, 120b, 120c, etc., with each lamina rotatably offset from one adjacent lamina, as viewed from the top end cover 52 in FIG. 12, by one circumferential center or helical offset to center spacing 124 of the apertures 122 which receive the heater elements 72. This provides a helically extending, stepwise flow path denoted by reference number 140 for the inner series of apertures 130 and reference number 142 for the outer series of apertures 132. This single step helical offset example shown in FIG. 13 significantly increases the surface area of the stack which is exposed through each helically extending bore or fluid flow path 140 and 142 and provides for greater heat absorption by the fluid flowing through the flow paths 140 and 142 due to the increased contact time between the fluid and the surfaces of the lamina 120 forming the fluid flow paths 140 and 142, etc., as compared to an arrangement where all of the apertures 130 are axially aligned with like apertures 130 in adjacent lamina 120 and the apertures 132 are likewise axially aligned with like apertures 132 in the adjacent lamina 120.

Each fluid flow path, such as fluid flow path 140 and 142, helically extends between the inlet chamber formed between one surface of the top end cover 52 and one end of the stack 50 and the outlet chamber formed between the bottom end cover 54 and the opposed end of the stack 50. Depending on the length of the stack 50, the flow paths 140 and 142, for example, can extend approximately 540° around a longitudinal axis of the stack 50 between the inlet and the outlet. This extending length, as compared to a straight throughbore or flow path, greatly increases the contact time between the fluid and the surrounding surfaces of the stack 50 so as to enable greater quantities of heat to be absorbed from the lamina 120 by the fluid to increase the efficiency of the heater module 10 of the present invention.

Figure 14:
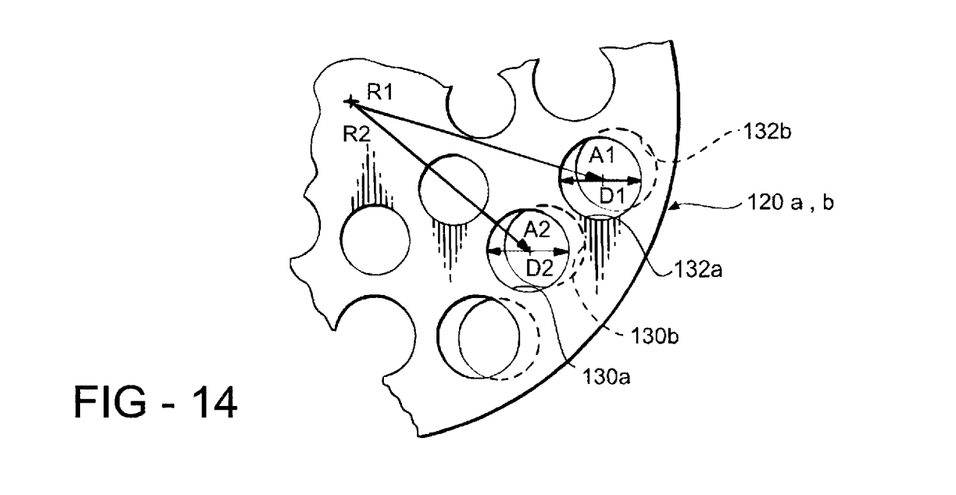
FIG. 14 is a partial, enlarged view of one of the heat exchange stack lamina according to the present invention.

Other features of the apertures 130 and 132 can be more clearly understood by referring to FIG. 14. As shown therein, the outer apertures 132 denoted in FIG. 14 as outer apertures 132a and 132b for two different lamina 120a and 120b, are disposed at a first radius $R_1$. The apertures 130a and 130b in the lamina 120a and 120b are disposed at a different, smaller radius $R_2$. Similarly, the diameter or maximum cross-section of the outer apertures 132a and 132b is greater than the diameter or maximum cross-section of the inner disposed apertures 130a and 130b. However, the helical offset which results in a step wise circumferential advance from the aperture 130a in the adjacent lamina 120a and between the aperture 132b in the lamina 120b from the aperture 132a in the lamina 120a still results in the same cross-section area in each of the bores 130 and 132 formed by the inner apertures 130 (130a, 130b, etc.,) and the outer apertures 132 (132a, 132b, etc.,). This forms equal cross-sectional flow paths and equal resistance to fluid flow in each of the helical bores 140 and 142 thereby creating equal flow rates through each of the bores 140 and 142 throughout the entire heat exchange stack 50.

In operation, with the heater module 10 assembled together as described above, a fluid supply from the pump 22 can be attached to the inlet fitting 76. Similarly, another conduit connected to the spray nozzle(s) 14 can be connected to the outlet 84. When the ignition 26 is turned "on", the controller 28 supplies power to the one or more heater elements 72 disposed in certain of the inner bores 122 in the stack 50. To quickly raise the temperature of fluid contained within the bores 140 and 142, all of the heater elements 72 can be activated. Once the temperature of the fluid in the stack 50 has reached a predetermined temperature suitable for discharge through the nozzle(s) 14, a thermocouple, not shown, connected to the stack 50 or situated in one of the bores 140 and 142 or adjacent the bottom end cover 84 will supply a feedback signal to the controller 28 which will then deactivate one or more of the heater elements 72 until only one heater element 72 is turned on continuously or cyclically to maintain the fluid temperature at the desired discharge temperature, such as 160° F.–170° F. Alternately, if more time is available to heat the fluid, only one or two of the heater elements 74 are activated.

When the vehicle driver activates the on/off switch 24, the pump 22 will be activated to pressurize the fluid delivery line through the heater module 10 to the spray nozzle(s) 14. This will cause the fluid in the stack 50 to be discharged through the outlet 84 to the spray nozzle(s) 14. Cooler fluid will then enter through the inlet 76 and be heated as it flows through the bores 140 and 142 and is discharged through the outlet 84 to the spray nozzle(s) 14.

Although the controller 28 can provide separate switchable signals to each of the heater elements 72 in order to control each heater element 72 separately under program or logic control, one simple approach includes the bi-metal element or a switch mounted between the power connections to one terminal 101 and each of the other terminals 101 connected to the additional heater elements 72. The bi-metal element can be set to open at a predetermined temperature, such as 50° C., thereby deactivating the associated heater element 72. This enables the additional heater elements 72, for example, to remain deactivated until a high heat requirement is initiated.

An important feature of the present invention is the ability to easily vary the total surface area of each bore 140 and 142 so as to vary the amount of the heat which is supplied to the fluid passing through the bores 140 and 142. A single step offset is shown, by example, in FIG. 13. Alternate the step arrangements are possible.

Figure 15:
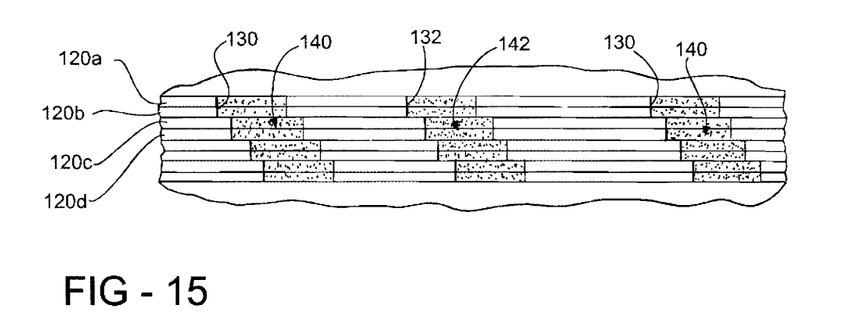
FIG. 15 is a partial, side elevational view, similar to FIG. 13, but showing a two step heat exchange stack lamina off-set.

For example, as shown in FIG. 15, a two pair step is shown. In this aspect of the invention, two adjacent lamina 120a and 120b are arranged axially concentric with each other so that the bores 130 and 132 are axially aligned.

However, the next adjacent pair of lamina 120c and 120d are rotatably offset by the helical offset. This creates a step between the first pair of lamina 120a and 120b and the second pair of lamina 120c and 120d. This step increases the total surface area exposed to the fluid passing the bores 140 and 142. As the lamina 120 are heated by the heater element 72, heat will be conducted through each lamina 120 and be radiated outward into the bores 140 and 142 where it is absorbed by the fluid passing through the bores 140 and 142 to quickly raise the temperature of such fluid to the desired outlet discharge temperature.

Figure 16:
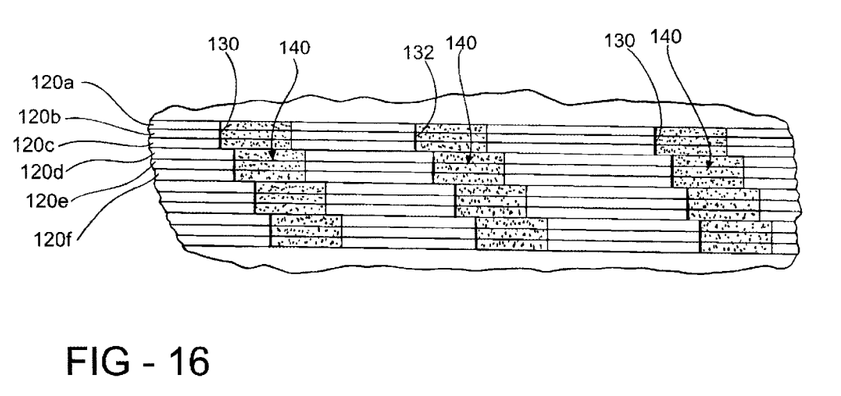
FIG. 16 is a partial, side elevational view, similar to FIG. 13, but showing a three step heat exchange stack lamina off-set.

An example of a different step configuration according to the present invention is shown in FIG. 16. In this example, three adjacent lamina 120a, 120b and 120c or 120d, 120e and 120f are identically arranged with the respective bores 130 and 132 axially aligned with the corresponding bores in the other lamina to form a three step offset. The adjacent three step group of lamina 120d, 120e and 120f, which also have the respective bores 130 and 132 coaxially aligned, will be rotatably offset by one helical offset step as shown in FIG. 16. The remaining groups of lamina continue to be rotatably offset by the same helical offset to further increase the surface area of the lamina exposed to the bores 140 and 142.

Figure 17:
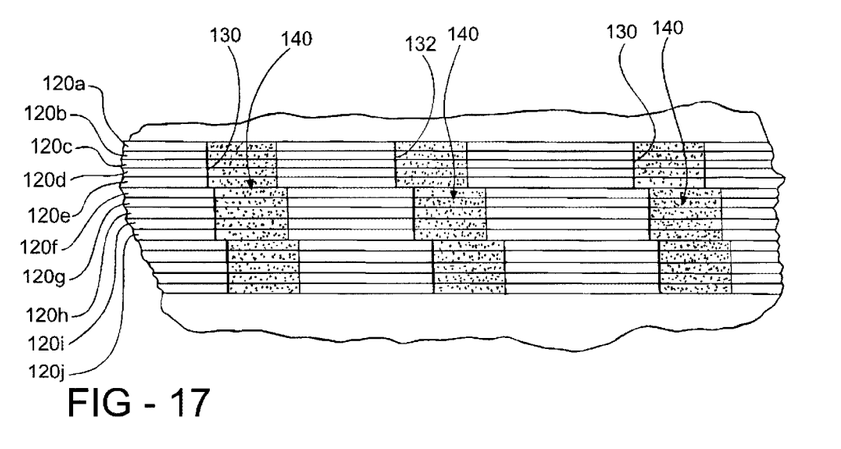
FIG. 17 is a partial, side elevational view, similar to FIG. 13, but showing a five step heat exchange stack lamina off-set.

A five lamina group step arrangement is shown by example in FIG. 17.

In this arrangement, the bores 130 and 132 in five adjacent lamina 120a, 120b, 120c, 120d and 120e are coaxially aligned. The next five lamina 120f–120j likewise have their bores 130 and 132 coaxially aligned, but rotatably offset by the helical offset in groups of five lamina.

It can thus be seen that the total surface area of the bores 140 and 142 can be easily increased or decreased. This allows greater or lesser amounts of heat to be radiated from the lamina 120 and absorbed by the fluid so as to enable the discharged temperature of the fluid to be varied as needed for a particular application.

In designing the overall dimensions of the heater module 10, the stepwise grouping of lamina as shown in FIGS. 13 and 15-17 will be considered along with the overall length of the stack 50 formed of a particular number of lamina 120 so as to obtain the desired fluid discharge temperature.

In summary, there has been disclosed a unique fluid heater which can be variably adjusted to easily provide a different predetermined discharge temperature with a specific stack length as needed for a number of different applications. Despite the variable fluid discharge temperatures which may be necessary for different applications, the overall construction of the heater is identical thereby minimizing manufacturing costs, assembly and part multiplication.

What is claimed is:

1. A fluid heater apparatus comprising:
    a thermally conductive mass having a plurality of throughbores extending through first and second ends, the thermally conductive mass formed of a plurality of lamina, each lamina carrying a plurality of first apertures defining portions of the throughbores and at least one second aperture;
    heater means mounted in the at least one second aperture in the lamina in the thermally conductive mass concentrically within and surrounded by the plurality of throughbores, the heater means supplying heat, when activated, to the thermally conductive mass; and a fluid inlet fluidically coupled to one end of each of the plurality of throughbores and a fluid outlet fluidically coupled to each of other ends of the throughbores to define a parallel flow path between the inlet and the outlet through the plurality of throughbores wherein fluid in the throughbores absorbs heat from the thermally conductive mass.

2. The heater apparatus of claim 1 wherein the plurality of throughbores each has a helical path between opposed ends.

3. The heater apparatus of claim 2 wherein the throughbores have identical flow cross-section areas.

4. A fluid heater apparatus comprising:

a thermally conductive mass having a plurality of throughbores extending through first and second ends;

each of the plurality of throughbores having a helical path between opposed ends, and identical flow cross-section areas, the throughbores arranged in first and second concentric circumferentially spaced rings about the thermally conductive mass;

heater means mounted in the thermally conductive mass concentrically within and surrounded by the plurality of throughbores, the heater means supplying heat, when activated, to the thermally conductive mass; and a fluid inlet fluidically coupled to one end of each of the plurality of throughbores and a fluid outlet fluidically coupled to each of the other ends of the throughbores to define a parallel flow path between the inlet and the outlet through the plurality of throughbores wherein fluid in the throughbores absorbs heat from the thermally conductive mass.

5. The heater apparatus of claim 4 wherein the maximum cross-sectional dimension area of the through bore in the first, innermost ring is less than the maximum cross-sectional dimension of the throughbores in the second, outermost ring.

6. A fluid heater apparatus comprising:

a thermally conductive mass having a plurality of throughbores extending through first and second ends;

the throughbores arranged about the first and second concentric circumferentially spaced rings about the thermally conductive mass;

heater means mounted in the thermally conductive mass concentrically within and surrounded by the plurality of throughbores, the heater means supplying heat, when activated, to the thermally conductive mass; and a fluid inlet fluidically coupled to one end of each of the plurality of throughbores and a fluid outlet fluidically coupled to each of other ends of the throughbores to define parallel flow paths between the inlet and the outlet through the plurality of throughbores wherein fluid in the throughbores absorbs heat from the thermally conductive mass.

7. A fluid heater apparatus comprising:

a thermally conductive mass having a plurality of throughbores extending through first and second ends;

the thermally conductive mass formed of a plurality of lamina, each lamina carrying an aperture defining a portion of the throughbores and an aperture defining a position of a bore for receiving a heater means therethrough;

certain lamina rotatably offset from adjacent lamina by an offset distance to create a stepwise helical advance in the throughbore through the stack of lamina between the first and second ends of the stack;

heater means mounted in the thermally conductive mass concentrically within and surrounded by the plurality of throughbores, the heater means supplying heat, when activated, to the thermally conductive mass; and a fluid inlet fluidically coupled to one end of each of the plurality of throughbores and a fluid outlet fluidically coupled to each of the other ends of the throughbores to define a parallel flow path between the inlet and the outlet through the plurality of throughbores wherein fluid in the throughbores absorbs heat from the thermally conductive mass.

8. The heater apparatus of claim 7 wherein each lamina is rotatably offset from adjacent lamina.

9. The heater apparatus of claim 7 wherein a plurality of lamina are coaxially aligned and rotatably offset from a like number of a plurality of lamina which are coaxially aligned with other.

10. The heater apparatus of claim 1 wherein the throughbores define parallel flow paths through the thermally conductive mass.

11. The heater apparatus of claim 1 wherein the heater means comprises:

at least one cylindrical heater element.

12. The heater apparatus of claim 1 wherein the heater means comprises a plurality of heater elements.

13. The heater apparatus of claim 12 further comprising:

a controller for controlling the activation of each of the plurality of heater elements.

14. The heater apparatus of claim 1 further comprising:

a controller for controlling the activation of the heater means.

15. The heater apparatus of claim 1 further comprising:

a plurality of other bores formed in the thermally conductive mass, concentrically within the throughbores, the other bores adapted for receiving the heater means, the heater means heating the thermally conductive mass to enable heat from the thermally conductive mass to be absorbed by fluid flowing through the throughbores in the thermally conductive mass.

16. A fluid heater apparatus comprising:

a thermally conductive mass having a plurality of throughbores extending through first and second ends;

the thermally conductive mass formed of a plurality of lamina, each lamina carrying an aperture defining a portion of the throughbore and an aperture defining a portion of a bore for receiving a heater means therethrough;

the plurality of lamina arranged in a plurality of groups, each group formed of an identical number of lamina, the groups of lamina coaxially aligned; and each group of lamina rotatably offset from adjacent groups of lamina by an offset distance to create a stepwise helical advance in the throughbores through the stack of lamina between the first and second ends of the stack;

heater means mounted in one of the bores in the thermally conductive mass concentrically within and surrounded by the plurality of throughbores, the heater means supplying heat, when activated, to the thermally conductive mass; and a fluid inlet fluidically coupled to one end of each of the plurality of throughbores and a fluid outlet fluidically coupled to each of other ends of the throughbores to define a parallel flow path between the inlet and the outlet through the plurality of throughbores wherein fluid in the throughbores absorbs heat from the thermally conductive mass.

17. The heater apparatus of claim 16 wherein the offset distance equals the circumferential distance to circumferentially spaced bores for receiving the heater means.

18. The heater apparatus of claim 16 wherein:

each group of lamina contains at least two lamina.

19. A method for heating fluid comprising the steps of:

providing a thermally conductive mass having a plurality of first throughbores extending through first and second ends;

forming a plurality of second bores in the thermally conductive mass concentrically with the first throughbores, mounting a heater means in the second bores in the thermally conductive mass concentrically within and surrounded by the plurality of first throughbores, the heater means supplying heat, when activated, to the thermally conductive mass; and fluidically coupling a fluid inlet to one end of each of the plurality of throughbores and a fluid outlet to each of the other ends of the throughbores to define at least one parallel flow path between the inlet and the outlet through the plurality of throughbores wherein fluid in the throughbores absorbs heat from the thermally conductive mass.

20. A fluid heater apparatus comprising:

a thermally conductive mass having a plurality of throughbores extending through first and second ends;

the thermally conductive mass formed of a plurality of lamina, each lamina carrying an aperture defining a portion of the throughbores and an aperture defining a position of a bore for receiving a heater means therethrough;

certain lamina rotatably offset from adjacent lamina by an offset distance to create a stepwise helical advance in the throughbore through the stack of lamina between the first and second ends of the stack;

a fluid inlet fluidically coupled to ne end of each of the plurality of throughbores and a fluid outlet fluidically coupled to each of the other ends of the throughbores to define a parallel flow path between the inlet and the outlet through the plurality of throughbores wherein fluid in the throughbores absorbs heat from the thermally conductive mass.

21. The heater apparatus of claim 20 wherein each lamina is rotatably offset from adjacent lamina.

22. The heater apparatus of claim 20 wherein a plurality of lamina are coaxially aligned and rotatably offset from a like number of a plurality of lamina which are coaxially aligned with other.

23. A vehicle window wash apparatus comprises:

a fluid source for supplying wash fluid;

a fluid discharge device fluidically coupled to the fluid source for discharging fluid pumped from the reservoir;

heater means disposed in fluid flow communication between the fluid source and the fluid discharge device;

a controller, coupled to the heater means; for supplying power to the heater;

the heater means including:

a thermally conductive mass having a plurality of throughbores extending through first and second ends;

at least one heater element mounted in the thermally conductive mass concentrically within and surrounded by the plurality of throughbores, the heater element supplying heat, when activated, to the thermally conductive mass; and a fluid inlet fluidically coupled to one end of each of the plurality of throughbores and a fluid outlet fluidically coupled to each of the other ends of the throughbores to define parallel flow paths between the inlet and the outlet through the plurality of throughbores wherein fluid in the throughbores absorbs heat from the thermally conductive mass.

24. The wash apparatus of claim 23 wherein the plurality of throughbores each has a helical path between opposed ends.

25. The wash apparatus of claim 23 wherein the thermally conductive mass is formed of a plurality of lamina, each lamina carrying an aperture defining a portion of the throughbores and an aperture defining a position of a bore for receiving the heater means therethrough.

26. The wash apparatus of claim 25 further comprising:

certain lamina rotatably offset from adjacent lamina by an offset distance to create a stepwise helical advance in the throughbore through the stack of lamina between the first and second ends of the stack.

27. The wash apparatus of claim 26 wherein each lamina is rotatably offset from adjacent lamina.

28. The wash apparatus of claim 26 wherein a plurality of lamina are coaxially aligned and rotatably offset from a like number of a plurality of lamina which are coaxially aligned with other.

29. A method for heating fluid comprising the steps of:

forming the thermally conductive mass of a plurality of lamina, each lamina carrying an aperture defining a portion of the throughbores, and another aperture defining a position of a bore for receiving a heater means;

mounting a heater means in the thermally conductive mass concentrically within and surrounded by the plurality of throughbores, the heater means supplying heat, when activated, to the thermally conductive mass; and fluidically coupling a fluid inlet to one end of each of the plurality of throughbores and a fluid outlet to each of the other ends of the throughbores to define at least one parallel flow path between the inlet and the outlet through the plurality of throughbores wherein fluid in the throughbores absorbs heat from the thermal conductive mass.

30. The wash apparatus of claim 23 wherein the at least one heater means element comprises:

at least one cylindrical heater element.

31. The wash apparatus of claim 23 wherein the heater element comprises a plurality of heater elements.

32. The wash apparatus of claim 23 further comprising: a plurality of bores formed in the thermally conductive mass, concentrically withing the throughbores, the bores adapted for receiving cylindrical heater means, the heater means heating the thermally conductive mass to enable heat from the thermally conductive mass to absorbed by fluid flowing through the throughbores in the thermally conductive mass.

33. The wash apparatus of claim 23 further comprising:

the thermally conductive mass formed of a plurality of lamina, each lamina carrying an aperture defining a portion of the throughbore and an aperture defining a portion of a bore for receiving the heater means therethrough;

the plurality of lamina arranged in a plurality of groups, each group formed of an identical number of lamina, the groups of lamina coaxially aligned; and each group of lamina rotatably offset from adjacent groups of lamina by a offset distance to create a stepwise helical advance in the throughbores through the stack of lamina between the first and second ends of the stack.

34. The wash apparatus of claim 33 wherein the offset distance equals the circumferential distance to circumferentially spaced bores for receiving the heater means.

35. The wash apparatus of claim 33 wherein:
each group of lamina contains at least two lamina.

36. A fluid heater apparatus comprising:
means for forming a thermally conductive mass having a plurality of throughbore extending through first and second ends;
means for mounting a heater means in the thermally conducive mass concentrically within and surrounded by the plurality of throughbores, the heater means supplying heat, when activated, to the thermally conductive mass; and
means for fluidically coupling a fluid inlet to one end of each of the plurality of throughbores and a fluid outlet to each of other ends of the throughbores to define at least one parallel flow path between the inlet and the outlet through the plurality of throughbores wherein fluid in the through bores absorbs heat from the thermally conductive mass.

37. A method for heating fluid comprising the steps of:
forming a thermally conductive mass having a plurality of throughbore extending through first and second ends;
forming the thermally conductive mass of a plurality of lamina, each lamina carrying a plurality of first apertures defining portions of the throughbores, and at least one second aperture defining a portion of another bore for receiving a heater means;
mounting a heater means in the another bore of the thermally conducive mass concentrically within and surrounded by the plurality of throughbores, the heater means supplying heat, when activated, to the thermally conductive mass; and
fluidically coupling a fluid inlet to one end of each of the plurality of throughbores and a fluid outlet to each of other ends of the throughbores to define at least one parallel flow path between the inlet and the outlet through the plurality of throughbores wherein fluid in the through bores absorbs heat from the thermally conductive mass.

38. A method for heating fluid comprising the steps of:
providing a thermally conductive mass having a plurality of throughbores extending through first and second ends;
forming each of the throughbores in a helical path between opposed ends;
mounting a heater means in the thermally conductive mass concentrically within and surrounded by the plurality of throughbores, the heater means supplying heat, when activated, to the thermally conductive mass; and
fluidically coupling a fluid inlet to one end of each of the plurality of throughbores and a fluid outlet to each of the other ends of the throughbores to define at least one parallel flow path between the inlet and the outlet through the plurality of throughbores wherein fluid in the throughbores absorbs heat from the thermally conductive mass.

39. The method of claim 37 further comprising the step of:
forming the throughbores with identical flow cross-section areas.

40. A method for heating fluid comprising the steps of:
proving a thermally conductive mass having a plurality of throughbores extending through first and second ends;
arranging the throughbores in first and second concentric, circumferentially spaced rings about the thermally conductive mass;
mounting a heater means in the thermally conductive mass concentrically within and surrounded by the plurality of throughbores, the heater means supplying heat, when activated, to the thermally conductive mass; and
fluidically coupling a fluid inlet to one end of each of the plurality of throughbores and a fluid outlet to each of the other ends of the throughbores to define at least one parallel flow path between the inlet and the outlet through the plurality of throughbores wherein fluid in the throughbores absorbs heat from the thermally conductive mass.

41. The method of claim 40 further comprising the step of:
forming the maximum cross sectional dimension area of the bores in the first innermost ring less than the maximum cross sectional dimension of the throughbores in the second outermost ring.

42. The method of claim 37 further comprising the step of:
forming the throughbores to define parallel flow paths through the thermally conductive mass.

43. The method of claim 29 further comprising the step of:
rotatably offsetting certain lamina from adjacent lamina by an offset distance to create a stepwise helical advance in the throughbore defining the fluid flow path through the stack of lamina between the first and second ends of the stack.

44. The method of claim 29 further comprising the step of:
rotatably offsetting each lamina from adjacent lamina.

45. The method of claim 29 further comprising the steps of:
forming a plurality of coaxially aligned lamina;
forming another set of a plurality of lamina; and
rotatably offsetting each set of lamina from each other.

* * * * *